United States Patent [19]
Wicki

[11] 3,975,369
[45] *Aug. 17, 1976

[54] 2:1 METAL COMPLEXES OF 2,2',4'-TRIHYDROXY-3,5-DINITROAZOBENZENE BOUND TO A DIPHENYLAMINE THROUGH AN AZO BRIDGE

[75] Inventor: Heinz Wicki, Basel, Switzerland

[73] Assignee: Sandoz Ltd., Basel, Switzerland

[*] Notice: The portion of the term of this patent subsequent to Jan. 22, 1991, has been disclaimed.

[22] Filed: Nov. 28, 1973

[21] Appl. No.: 419,509

Related U.S. Application Data
[63] Continuation-in-part of Ser. No. 60,748, Aug. 3, 1970, Pat. No. 3,787,387.

[30] Foreign Application Priority Data
Nov. 15, 1973 Switzerland.................. 16103/73
Aug. 7, 1969 Switzerland.................. 11976/69

[52] U.S. Cl. ................. 260/145 B; 260/148; 260/151; 260/206; 260/576
[51] Int. Cl.$^2$ ............ C09B 45/22; C09B 45/32; D06P 1/10; D06P 3/00
[58] Field of Search ............ 260/145 A, 145 B, 148

[56] References Cited
UNITED STATES PATENTS

| | | | |
|---|---|---|---|
| 2,136,650 | 11/1938 | Crossley et al. | 260/145 A |
| 2,200,445 | 5/1940 | Fellmer | 260/145 A |
| 2,775,581 | 12/1956 | Neier et al. | 260/145 B |
| 2,933,488 | 4/1960 | Biedermann et al. | 260/145 A |
| 2,933,489 | 4/1960 | Biedermann et al. | 260/145 A |
| 2,933,490 | 4/1960 | Biedermann et al. | 260/145 B |
| 3,359,253 | 12/1967 | Biedermann et al. | 260/145 B |
| 3,374,219 | 3/1968 | Biedermann et al. | 260/145 B |
| 3,398,132 | 8/1968 | Dehnert | 260/145 A |
| 3,406,160 | 10/1968 | Wicki | 260/145 C |
| 3,459,727 | 8/1969 | Steiner et al. | 260/145 B |
| 3,787,387 | 1/1974 | Wicki | 260/145 A |

FOREIGN PATENTS OR APPLICATIONS
754,361 9/1970 Belgium ................ 260/145 A Primary Examiner—Floyd D. Higel
Attorney, Agent, or Firm—Gerald D. Sharkin; Richard E. Vila; Melvyn M. Kassenoff

[57] ABSTRACT

Dyes of the formula

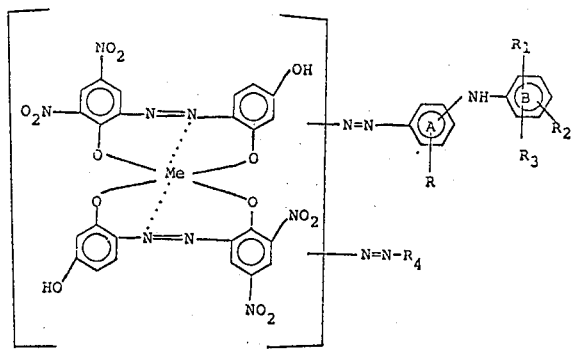

wherein each of R, $R_1$, $R_2$ and $R_3$ is independently hydrogen, halo, nitro, unsubstituted or substituted alkyl or alkoxy, carboxy or sulfo, $R_4$ is a diazo component radical, and Me is a metal atom, are useful for dyeing and printing of leather. They exhaust well on leathers of low affinity and give level dyeings. The dyeings exhibit good fastness to light, water, washing, perspiration, ironing and formaldehyde.

17 Claims, No Drawings

2:1 METAL COMPLEXES OF 2,2',4'-TRIHYDROXY-3,5-DINITROAZOBENZENE BOUND TO A DIPHENYLAMINE THROUGH AN AZO BRIDGE

This application is a continuation-in-part of application Ser. No. 60,748, filed Aug. 3, 1970 and now U.S. Pat. No. 3,787,387.

This invention is directed to new metallized polyazo dyes which are notable for their improved power of exhaustion on leathers of low affinity and are useful for dyeing and printing various types of leather.

It is desirable for these dyes to contain as their basic structural unit a group of the formula

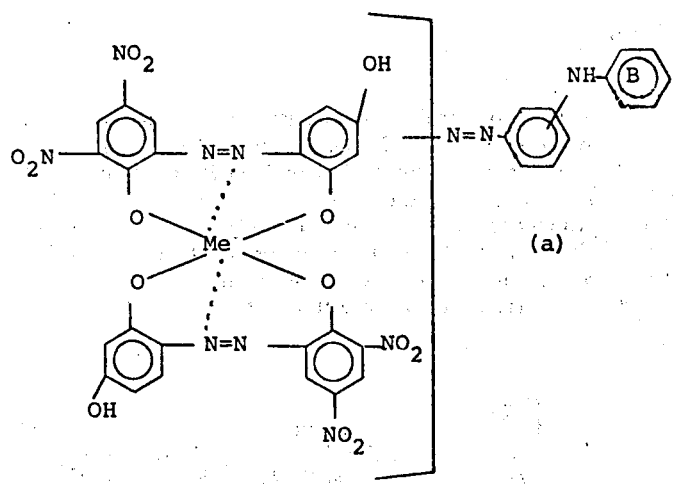

(a)

in which the aromatic ring B bears preferably an —SO$_3$H and an —NO$_2$ group.

The invention thus relates to new metallized polyazo dyes, and mixture of the said dyes, which are of the formula where R stands for hydrogen, halogen, nitro, substituted or unsubstituted alkyl or alkoxy, —COOH or —SO$_3$H, R$_1$ for hydrogen, halogen, nitro, substituted or unsubstituted alkyl or alkoxy, —COOH or —SO$_3$H, R$_2$ for hydrogen, halogen, nitro, substituted or unsubstituted alkyl or alkoxy, —COOH or —SO$_3$H, R$_3$ for hydrogen, halogen, nitro, substituted or unsubstituted alkyl or alkoxy, —COOH or —SO$_3$H, R$_4$ for the radical

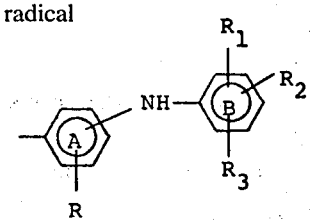

or the radical of a freely selected diazo component, and Me for a metal atom.

The new dyes can be produced by coupling in either order 1 mole of the diazo compound obtained from an amine of the formula

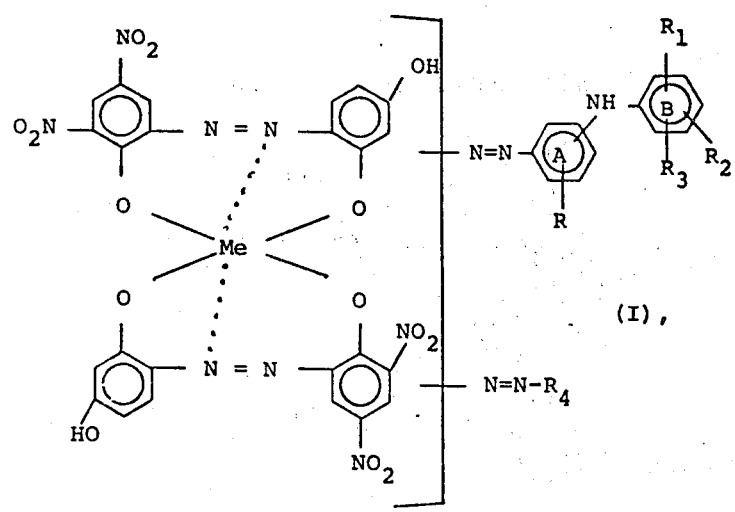

(I),

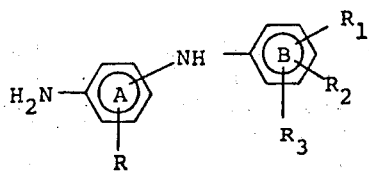

(II)

and 1 mole of the diazo compound obtained from an amine of the formula $R_4 - NH_2$     (III)

with 2 moles of a compound of the formula

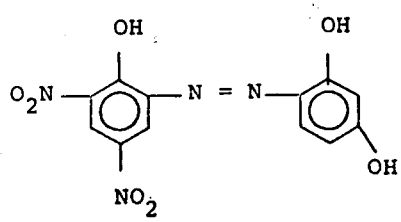

(IV)

and treating the resulting azo compound in substance with a metal donor to give the compound of formula (I).

Good dyes of formula (I) are obtained by coupling 1 mole of a compound of the formula

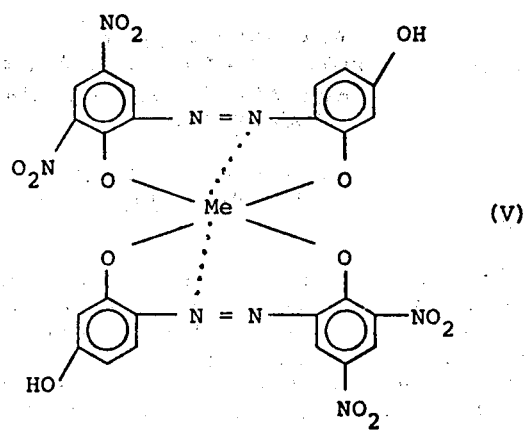

(V)

with 1 mole of the diazo compound obtained from an amine of formula (II) and 1 mole of the diazo compound from an amine of formula (III). Iron, chromium and cobalt compounds are of special interest for the production of these metallized dyes. Good dyes are obtained when a coupling component of formula (V) containing iron, chromium or cobalt is used.

Preferred azo dyes are those of the formula

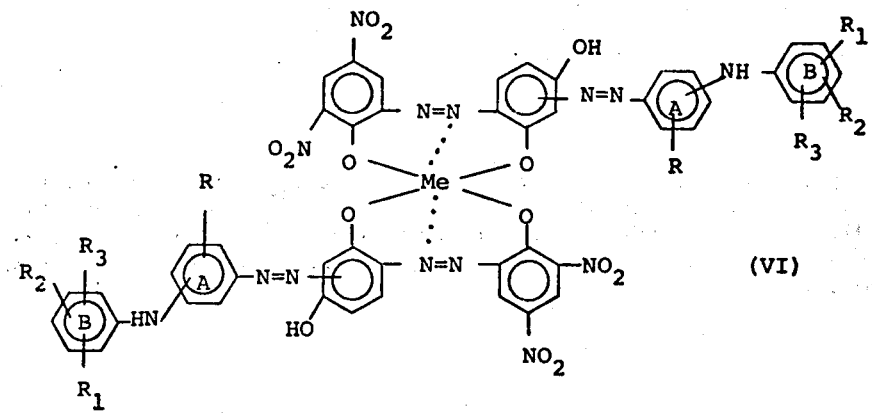

(VI)

and especially those of the formula

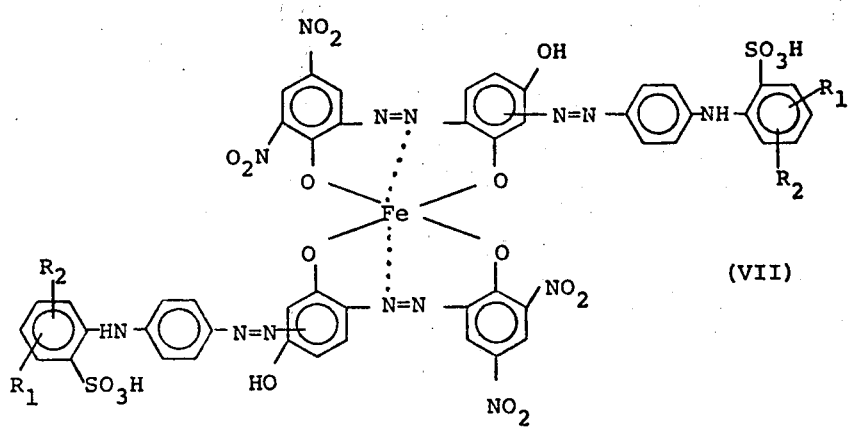

(VII)

Any of the known coupling methods can be used. For instance, the coupling reaction yielding the monoazo dye of formula (IV) can be carried out in aqueous alkaline medium at a temperature from −10°C to room temperature, if necessary in the presence of sodium chloride.

Similarly, the coupling of the monoazo dye of formula (IV) with a diazotized aminodiphenylamine or another diazo component to form the final dye can be carried out in aqueous alkaline medium at temperatures of −10°C to room temperature.

Metallization is best carried out in aqueous medium, with the addition of an organic solvent if necessary, or in an organic solvent alone. For this step of the process an acid medium is best, although metallization can also be accomplished in neutral to alkaline medium.

The suitable chromium compounds include chromium trioxide, chromic fluoride, chromic sulphate, chromic formate, chromic acetate, chromic potassium sulphate and chromic ammonium sulphate. The chromates, e.g. sodium and potassium chromate and bichromate, are also highly suitable for metallization. Iron and cobalt, formate, acetate, sulphate and chloride exemplify the suitable iron and cobalt compounds.

In each instance "halogen" represents bromine, fluorine or, preferably, chlorine. The substituted or unsubstituted alkyl and alkoxy radicals are preferably lower molecular and have 1, 2, 3 or 4 carbon atoms. If they are substituted they bear, in particular, halogen atoms, hydroxyl or cyano groups; these radicals then stand for methyl, ethyl, propyl, iso-propyl, butyl, iso-butyl, methoxy, ethoxy, cyanoethyl, hydroxyethyl, chloromethyl, chloroethyl, etc.

Examples of suitable diazo components are those of substituted or unsubstituted aminobenzenes, aminonaphthalenes, aminohydroxynaphthalenes, aminoaphthalenesulphonic acids, aminohydroxynaphthalenesulphonic acids, etc.. These latter radicals, and also the rings A and/or B, may be substituted by halogen, nitro, cyano, hydroxyl, amino, alkyl, alkoxy, sulphonic acid, carboxyl, sulphonic acid or carboxylic acid amide, alkylsulphonyl, arylsulphonyl, etc.. Alternatively, they may be substituted by azo compounds. The salt forms, e.g. alkali metal salts and especially sodium salts, are preferred.

The compounds of formula (I) may bear 1 to 4, preferably 2 or 3, —SO$_3$H and/or —COOH groups. Preferably at least one of the rings A and B bears a sulfo group.

The metallized polyazo dyes of this invention are used for dyeing and printing leather. They are notable for good power of build-up from neutral to weakly acid dyebaths and good level dyeing properties. On leathers tanned with different tanning agents they give dyeings of consistant shade which have good fastness to light, water, washing, perspiration, ironing and formaldehyde. The dyeings on chrome suede leather show good buffing fastness. On leathers with low affinity for dyes, such as those with a chrome-vegetable or chrome-synthetic tannage, the dyes build up to give dyeings of full depth; they also show good exhaustion power from a neutral medium on this type of leather.

In the following Examples the parts and percentages are by weight and the temperaturs in degrees centigrade.

EXAMPLE 1

398 parts of 2-amino-4,6-dinitrophenol are diazotized and coupled at pH 9 with 220 parts of 1,3-dihydroxybenzene using the normal methods. The resulting compound of formula (IV) (640 parts) is isolated and mixed in water at pH 4 with a solution of 278 parts of iron sulphate in 500 parts of water. The mixture is reacted for 1 hour at 98°– 100 °. The metallized dye is isolated and suspended in 500 parts of water. At pH 9 the diazo compound, prepared from 618 parts of 4-amino-4'-nitro-2'-sulphodiphenylamine, is dropped into the suspension. On completion of the coupling reaction the dye is isolated with sodium chloride and dried. It corresponds to the formula

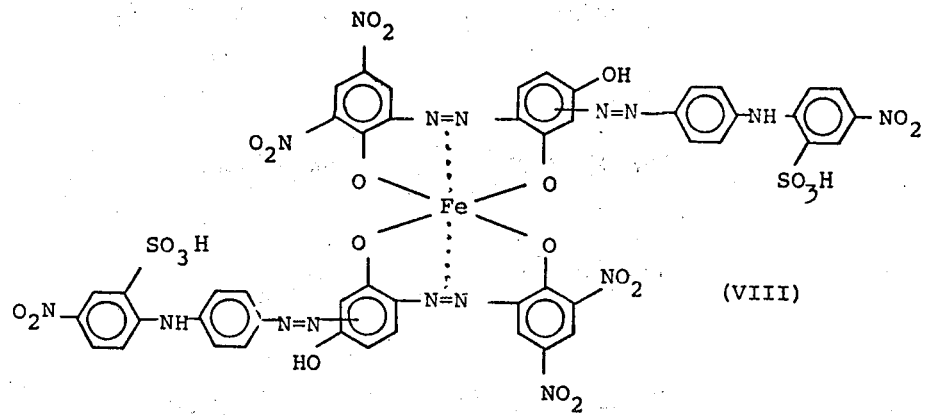

and is obtained in the form of the sodium salt as a dark brown powder which dissolves readily in water and gives fast red-brown dyeings on leather.

The table below shows the structural composition of further dyes which can be produced in accordance with the procedure of Example 1. They are of formula (I) and are specified by the compound of formula (V) in column A, the amine of formula (II) in column B, the amine of formula (III) in column C and in the final column by the shade of the dyeings on leather given by the iron, cobalt and chromium complexes of the dye.

Table

| Example No. | A Component of Formula (V) | B Amine of formula (II) | C Amine of formula (III) | D Fe | Co | Cr |
|---|---|---|---|---|---|---|
| 2 | Compound of formula (V) | $NH_2$–⟨○⟩($CH_3$)–NH–⟨○⟩($SO_3H$)–$NO_2$ | $NH_2$–⟨○⟩($CH_3$)–$SO_3H$ | dark red-brown | dark violet brown | dark violet brown |
| 3 | '' | $NH_2$–⟨○⟩–NH–⟨○⟩($SO_3H$)–$NO_2$ | $NH_2$–⟨○⟩($SO_3H$)–NH–⟨○⟩ | '' | '' | '' |
| 4 | '' | $NH_2$–⟨○⟩–NH–⟨○⟩($SO_3H$)–$NO_2$ | $NH_2$–⟨○⟩($SO_3H$)–$NO_2$ | '' | '' | '' |
| 5 | '' | $NH_2$–⟨○⟩–NH–⟨○⟩($SO_3H$)–$NO_2$ | $NH_2$–naphthyl–$SO_3H$ | '' | '' | '' |
| 6 | '' | $NH_2$–⟨○⟩–NH–⟨○⟩($SO_3H$)–$NO_2$ | $NH_2$, OH, $SO_3H$, $SO_3H$ naphthalene | '' | '' | '' |
| 7 | '' | $NH_2$–⟨○⟩–NH–⟨○⟩($SO_3H$)–$NO_2$ | HO, $NH_2$, $SO_3H$, $NO_2$ naphthalene | '' | '' | '' |
| 8 | '' | $NH_2$–⟨○⟩–NH–⟨○⟩($NO_2$)–$SO_3H$ | $H_2N$–⟨○⟩–NH–⟨○⟩($NO_2$)–$SO_3H$ | '' | '' | '' |
| 9 | '' | $H_2N$–⟨○⟩($SO_3H$)–NH–⟨○⟩ | $H_2N$–⟨○⟩($SO_3H$)–NH–⟨○⟩ | '' | '' | '' |
| 10 | '' | $NH_2$–⟨○⟩(COOH)–NH–⟨○⟩–$NO_2$ | $NH_2$–⟨○⟩($SO_3H$)–$NO_2$ | '' | '' | '' |
| 11 | '' | $NH_2$–⟨○⟩(COOH)–NH–⟨○⟩($NO_2$)–$NO_2$ | $NH_2$–⟨○⟩–$SO_3H$ | '' | '' | '' |
| 12 | '' | $NH_2$–⟨○⟩–NH–⟨○⟩($SO_3H$)–$NO_2$ | $NH_2$–⟨○⟩(Cl)–$NO_2$ | '' | '' | '' |

DYEING EXAMPLE A

In a drum dyeing machine 100 parts of freshly tanned, neutralized chrome grain leather are dyed for 30 minutes at 65° from a liquor consisting of 250 parts of water and 1 part of the dye synthesized as given in Example 1. After this time 2 parts of an anionic fatliquor based on sulphonated train oil are added and drumming is continued for 30 minutes. The leater leather then removed, dried under standard conditions and finished. The red-brown dyeing obtained on the leather is extremely level.

DYEING EXAMPLE B 100 parts of calf suede are wet back in a drum dyeing machine for 4 hours in a bath of 1000 parts of water and 2 parts of ammonia. The bath is dropped and a fresh bath set with 500 parts of water, 2 parts of ammonia and 10 parts of the dye described in Example 1. The suede is drum dyed in this bath for 1 hour 30 minutes at 65°. To exhaust the dyebath, 4 parts of 85 % formic acid are slowly added, after which the leather is drummed further to complete fixation of the dyeing. On removal, the suede is rinsed, dried and finished by the normal methods, and the nap buffed. The suede is dyed in a red-brown shade of notably good levelness.

DYEING EXAMPLE C 100 parts of chrome-vegetable tanned lambskin are dyed in a drum dyeing machine for 45 minutes at 55° from a bath of 1000 parts of water, 1.5 parts of an anionic sperm oil emulsion and 10 parts of the dye produced as in Example 1. The dyeing is fixed by the gradual addition in 30 minutes of 5 parts of 85 % formic acid. After the normal drying and finishing treatments a leather dyed in a level red-brown shade is obtained.

DYEING EXAMPLE D

A solution of 20 parts of the dye of Example 1 in 847 parts of water, 150 parts of ethyl glycol and 3 parts of 85 % formic acid is applied to the grain side of a buffed, combination tanned side leather, either by spraying, flow coating or with a plush pad. The leather is dried under mild conditions and finished. A level, red-brown leather dyeing which has good fastness properties is obtained.

Having thus disclosed, what I claim is:
1. A dye of the formula

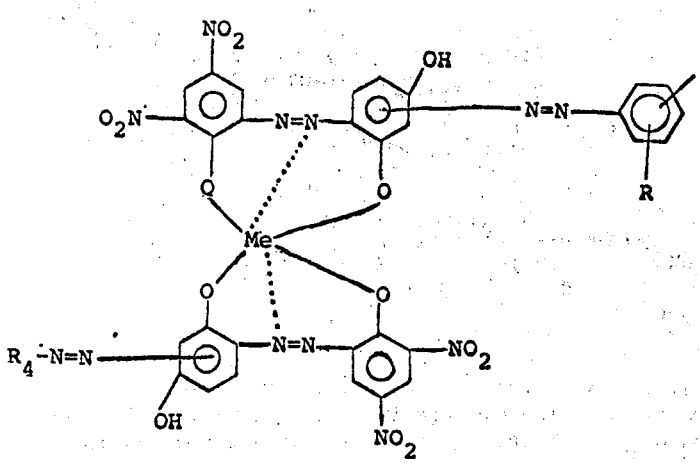

wherein each of
R, $R_1$, $R_2$ and $R_3$ is independently hydrogen, halo, nitro, alkyl, alkyl substituted by halo, hydroxy or cyano, alkoxy, alkoxy substituted by halo, hydroxy or cyano, carboxy or sulfo,
$R_4$ is a diazo component radical, and
Me is iron, cobalt or chromium,
wherein
each alkyl, alkoxy, alkyl chain of substituted alkyl and alkoxy chain of substituted alkoxy independently has 1, 2, 3 or 4 carbon atoms, and
each halo is independently fluoro, chloro or bromo.
2. A dye according to claim 1 with the proviso that the total number of sulfo and carboxy groups is 1 to 4.
3. A dye according to claim 2 wherein each substituted alkyl and substituted alkoxy is monosubstituted.
4. A dye according to claim 3 wherein Me is chromium.
5. A dye according to claim 3 wherein Me is cobalt.
6. A dye according to claim 3 wherein Me is iron.
7. A dye according to claim 1 wherein $R_4$ is phenyl, naphthyl, substituted phenyl, substituted naphthyl or

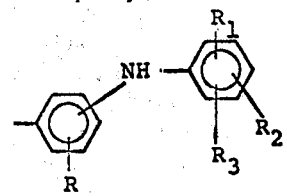

wherein
each substituent of substituted phenyl and substituted naphthyl is independently halo, nitro, cyano, hydroxy, amino, alkyl, alkoxy, sulfo, carboxy, sulfamoyl, carbamoyl or alkylsulfonyl, and
each R, $R_1$, $R_2$ and $R_3$ is independently hydrogen, halo, nitro, alkyl, alkyl substituted by halo, hydroxy or cyano, alkoxy, alkoxy substituted by halo, hydroxy or cyano, carboxy or sulfo,
with the proviso that $R_4$ is a diazo component radical.
8. A dye according to claim 7 wherein each substituted alkyl and substituted alkoxy is monosubstituted, and the total number of sulfo and carboxy groups is 1 to 4.
9. A dye according to claim 7 having the formula

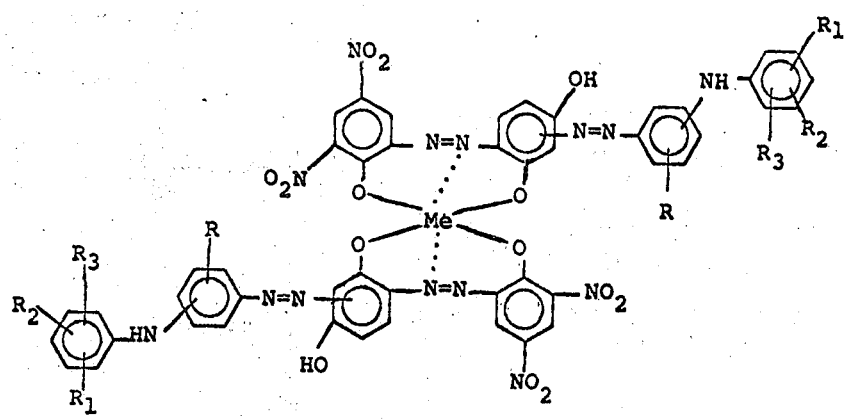

wherein each R, $R_1$, $R_2$ and $R_3$ is independently hydrogen, halo, nitro, alkyl, alkyl substituted by halo, hydroxy or cyano, alkoxy, alkoxy substituted by halo, hydroxy or cyano, carboxy or sulfo.

10. A dye according to claim 9 wherein
each substituted alkyl and substituted alkoxy is monosubstituted, and
the total number of sulfo and carboxy groups is 1 to 4.

11. A dye according to claim 10 having the formula

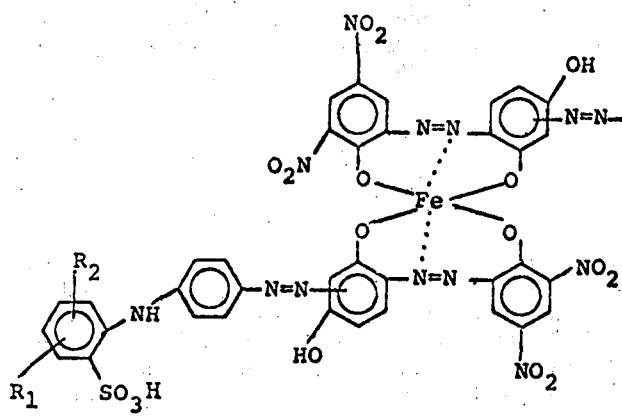

wherein each $R_1$ and $R_2$ is independently hydrogen, halo, nitro, alkyl, alkyl substituted by halo, hydroxy or cyano, alkoxy, alkoxy substituted by halo, hydroxy or cyano, carboxy or sulfo.

12. A dye according to claim 1 wherein
each substituted alkyl and substituted alkoxy is monosubstituted, and
the total number of sulfo and carboxy groups is 2 to 4.

13. A dye according to claim 10 wherein each R, $R_1$, $R_2$ and $R_3$ is independently hydrogen, halo, nitro, alkyl, alkyl monosubstituted by halo, hydroxy or cyano, alkoxy, carboxy or sulfo.

14. A dye according to claim 13 having the formula

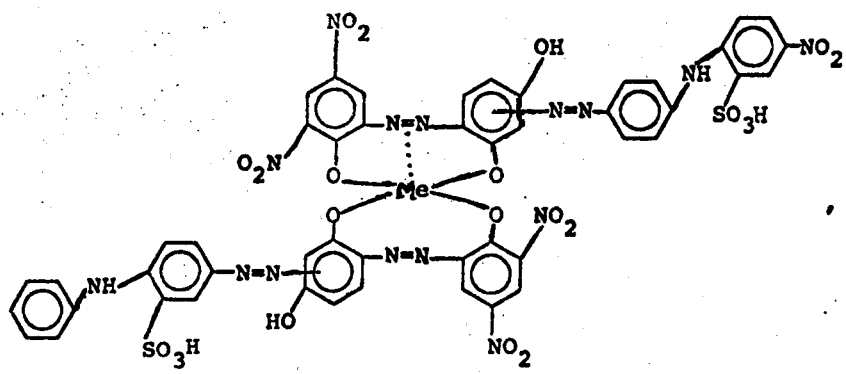

wherein Me is iron, cobalt or chromium.

15. A dye according to claim 14 wherein Me is iron.

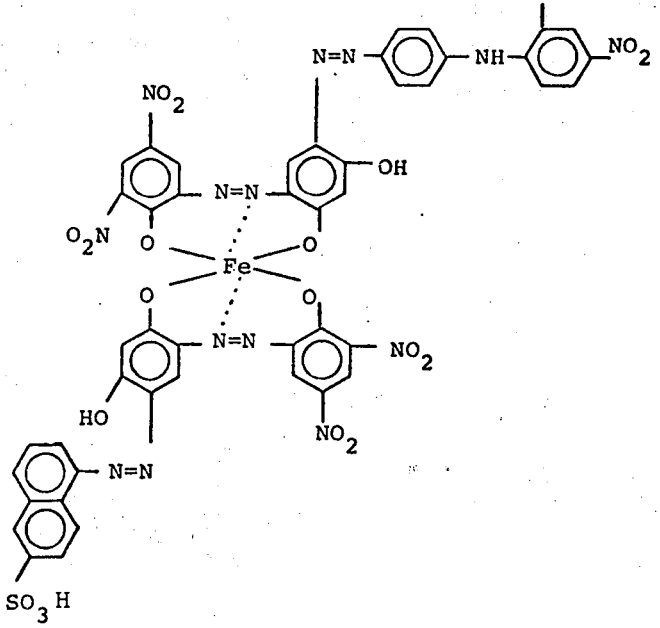

17. The dye according to claim 8, having the formula
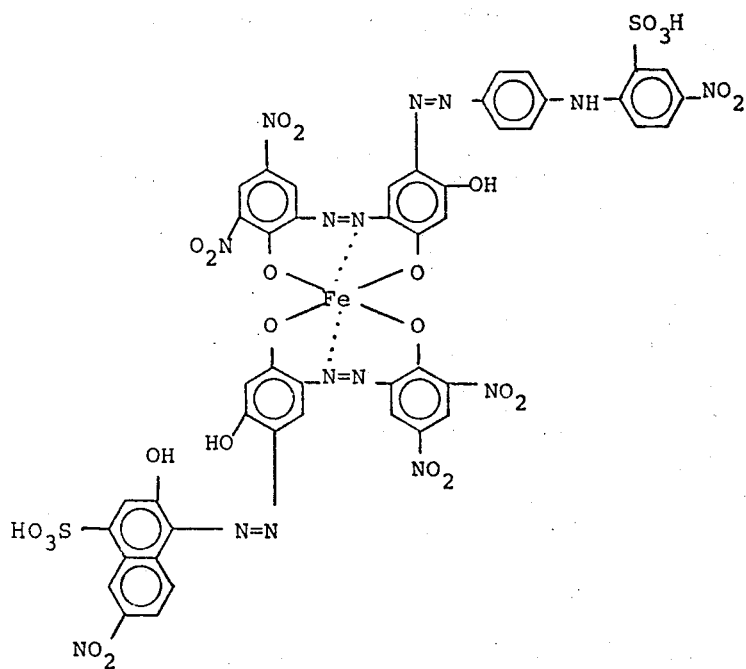

16. The dye according to claim 8, having the formula